United States Patent
Grassi et al.

(10) Patent No.: US 8,690,616 B2
(45) Date of Patent: Apr. 8, 2014

(54) SHIP PROPULSION SYSTEM

(75) Inventors: Davide Grassi, Riva del Garda (IT); Paolo Stasolla, Bari (IT); Andrea Pellegrinetti, Malcesine (IT); Adriano Zanfei, Madrano (IT); Michele Zottele, Trento (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 286 days.

(21) Appl. No.: 13/262,961

(22) PCT Filed: Feb. 9, 2010

(86) PCT No.: PCT/EP2010/051577
§ 371 (c)(1),
(2), (4) Date: Oct. 5, 2011

(87) PCT Pub. No.: WO2010/115647
PCT Pub. Date: Oct. 14, 2010

(65) Prior Publication Data
US 2012/0028514 A1 Feb. 2, 2012

(30) Foreign Application Priority Data
Apr. 7, 2009 (DE) .......................... 10 2009 002 263

(51) Int. Cl.
*B63H 21/20* (2006.01)
*B63H 5/125* (2006.01)
*B63H 23/00* (2006.01)
*B63H 21/21* (2006.01)

(52) U.S. Cl.
USPC .......................................................... 440/3

(58) Field of Classification Search
USPC .................. 440/3, 7, 51, 79, 83, 1, 47, 53, 58
See application file for complete search history.

(56) References Cited

U.S. PATENT DOCUMENTS

| | | | |
|---|---|---|---|
| 3,238,911 | A | 3/1966 | Pazulski |
| 3,619,632 | A | 11/1971 | Labombarde |
| 4,334,489 | A | 6/1982 | Seitzinger et al. |

(Continued)

FOREIGN PATENT DOCUMENTS

| | | |
|---|---|---|
| AT | 008 288 U1 | 5/2006 |
| DE | 75 08 341 U | 9/1975 |
| DE | 26 37 345 A1 | 2/1978 |
| DE | 41 05 318 A1 | 8/1992 |

(Continued)

OTHER PUBLICATIONS

Iskra Avtoelektrika, D.D, Integrated Starter Motor Generators, Mar. 2008.

*Primary Examiner* — Stephen Avila
*Assistant Examiner* — Anthony Wiest
(74) *Attorney, Agent, or Firm* — Davis & Bujold, PLLC; Michael J. Bujold

(57) ABSTRACT

A method for operating a ship propulsion system, in particular a sailing ship propulsion system, comprising an internal combustion engine (303), at least one shifting clutch (319), and a drive device (309) for transmitting drive power to at least one propeller (308). The direction of thrust of the propeller (308) is changed via the drive device (309) which is designed as a ship propulsion system which can be pivoted about a substantially vertical control axis (320) by pivoting a thrust unit (321) associated with the drive device (309). For this purpose, the pivotable thrust unit (321) is pivoted approximately 180° in the opposite direction to reverse the direction of thrust of the propeller (108).

12 Claims, 8 Drawing Sheets

(56) References Cited

U.S. PATENT DOCUMENTS

| | | | |
|---|---|---|---|
| 4,611,549 A | 9/1986 | Kodera et al. | |
| 6,688,927 B2 * | 2/2004 | Aarnivuo | 440/58 |
| 7,473,149 B2 | 1/2009 | Mizokawa | |
| 7,621,789 B2 | 11/2009 | Mizokawa | |
| 8,062,081 B2 * | 11/2011 | Barrett et al. | 440/1 |
| 2009/0209146 A1 | 8/2009 | Jegel | |
| 2010/0190392 A1 * | 7/2010 | Muller et al. | 440/51 |

FOREIGN PATENT DOCUMENTS

| | | |
|---|---|---|
| DE | 10 2008 024 540 A1 | 12/2009 |
| EP | 0 035 859 A2 | 9/1981 |
| EP | 1 914 161 A2 | 4/2008 |
| EP | 2 082 955 A1 | 7/2009 |
| GB | 1 473 063 | 5/1977 |
| SI | 22377 A | 4/2008 |
| WO | 2009/141254 A3 | 11/2009 |

\* cited by examiner

SHIP PROPULSION SYSTEM

This application is a National Stage completion of PCT/EP2010/051577 filed Feb. 9, 2010, which claims priority from German patent application serial no. 10 2009 002 263.5 filed Apr. 7, 2009.

FIELD OF THE INVENTION

The invention relates to a method for operating a ship propulsion system, in particular of a sailing ship, and a drive device therefor.

BACKGROUND OF THE INVENTION

Sailing ships require an additional propulsion system when wind conditions are insufficient to propel the sailing ship, or when maneuvers are carried out for docking and undocking. Sailing ship propulsion systems in which an internal combustion engine drives a propeller are known. The internal combustion engine is usually in the form of a diesel engine. In the motor mode, the sailing ship is steered using a rudder blade which is also used for steering in the sailing mode.

The catalog entitled "Integrated Starter Motor Generators" from the company Iskra Avtoelektrika, which is the owner of SI 22377 A, shows a ship propulsion system which comprises a parallel hybrid drive of the type described in SI 22377 A, and a stern drive. A Z-shaped, two-fold redirection of the drive train to the propeller takes place in the stern drive via two bevel gear systems. The first clutch is in the form of a multi-disk clutch or claw clutch. This parallel hybrid drive can be used to select the following operating modes: in a starter operating mode, the first clutch is engaged and the second clutch is disengaged. In this case, the electric machine functions as a starter and starts the internal combustion engine. As soon as the internal combustion engine is running, the drive system is automatically switched via the electronic control unit to the generator mode, in which the first clutch is likewise engaged and the second clutch is disengaged. The internal combustion engine drives the electric machine which functions as a generator and therefore charges the battery. Optionally, the battery can be charged via the electric power grid using the converter-charging unit while the ship is docked in the harbor. In the electric drive mode, the first clutch is disengaged and the internal combustion engine idles. The second clutch is engaged and therefore the electric machine, which now functions as a motor, drives the propeller. In a so-called booster mode, both clutches are engaged and the electric machine and the internal combustion engine operate in parallel. The cumulative drive power of the two machines drives the propeller.

In the stern drive shown, the direction of thrust of the propeller is reversed by reversing the propeller rotation, which may be necessary, for instance, to reverse the direction of travel when docking or undocking. To this end, a double-cone clutch which can be switched between the two directions of rotation is provided to change the rotational direction of the propeller. The solution with the double-cone clutch includes additional components and is difficult to assemble, which are disadvantages. Moreover, the shifting procedure is accompanied by poor shifting behavior in the form of torque surges and the associated material stress, as well as jerky propulsion and an audible noise. A further disadvantage associated with reversing the direction of thrust by reversing the rotational direction of the propeller is the reduced efficiency in the conversion of mechanical energy into energy of flow since the propeller blade geometry is typically designed or optimized for only one rotational direction.

SUMMARY OF THE INVENTION

The problem addressed by the invention is that of providing a method for the efficient, reversible propulsion of a ship, in particular a sailing ship, and creating a structurally simple drive device therefor.

A ship propulsion system, in particular a sailing ship propulsion system, comprises an internal combustion engine, at least one shifting clutch, and a drive device for transmitting drive power to at least one propeller. Therefore, in a method according to the invention, the drive device which is in the form of a ship propulsion system which can pivot about a substantially vertical control axis is used to change the direction of thrust of the propeller by pivoting a thrust unit associated with the drive device. This design of a drive device is also referred to as a rudder propeller.

The pivotable thrust unit is pivoted approximately 180° in the opposite direction to reverse the direction of thrust of the propeller. As a result, it is possible to reverse the direction of thrust of the propeller without changing the rotational direction of the propeller. The potential to reverse the direction of thrust in such a manner is advantageous for maneuvering in particular. In contrast to the prior art, an additional double clutch or reversing clutch, which has the stated disadvantages in regard to noise, shifting behavior, design complexity and costs, is not required in the drive device in order to reverse the direction of thrust. Moreover, the pivotable ship propulsion system permits the propeller thrust to be steered in any direction, thereby making it possible not only to reverse the direction of travel, but also to perform any maneuver. In particular, a lateral thrust component, i.e. a direction of thrust which does not lie in the longitudinal direction of the ship, can be generated without a cross jet propeller. A further advantage of a reversal of the direction of thrust without changing the rotational direction of the propeller is good propulsion efficiency and effective conversion of mechanical energy into energy of flow at the propeller. The reason for this is that the optimal configuration of the propeller blade geometry is designed for only one direction of rotation. In an opposite direction of rotation of the propeller, the efficiency of energy conversion is poorer than in the rotational direction for which the propeller blade geometry was designed and optimized.

In an advantageous embodiment of the method according to the invention, a current first position of the thrust unit is recorded in an electronic control unit. If a request to reverse the direction of thrust is entered into the electronic control unit, the thrust unit is pivoted from the current first position of the thrust unit by approximately 180° into an opposite, second position. As a result, the direction of thrust can be reversed from any position of the pivotable ship propulsion system, such as when the direction of thrust is transverse to the longitudinal axis of the ship, which is required, inter alia, when docking.

Furthermore, it is possible to adjust the direction of thrust of the thrust unit using a rudder device, and to enter the request to reverse the direction of thrust using a selector lever of a control device.

Alternatively thereto, the control device can also be in the form of a joystick, a sliding regulator, an actuator wheel, or an adjustment function on a screen or a panel with a touchscreen. Another possibility would be to integrate the function of the control device in the function of a further control device for other components.

According to a preferred embodiment of the method, when the thrust unit is in a first position, the selector lever is in a first adjustment range and, when the thrust unit is in a second position which is opposite the first position, the selector lever is in a second adjustment range. To reverse the direction of thrust, the selector lever is moved from the particular position of the thrust unit, past a middle position, and into the particular other adjustment range.

Within this framework it is possible to adjust the rotational speed of the internal combustion engine and, therefore, the rotational speed of the propeller by displacing the selector lever within the particular adjustment range. This results in the advantage that the request to reverse the direction of thrust and the adjustment of the propeller or engine speed are now combined in a single control device.

According to a particular embodiment of the method, in a first position of the thrust unit, the propeller thrust is directed astern to propel the ship forward and, in a second position of the thrust unit opposite the first position, the propeller thrust is directed toward the bow to propel the ship in reverse. It is therefore possible to reverse from forward to backward and vice versa without changing the rotational direction of the propeller, and without the associated disadvantages.

In a particularly advantageous variant, the propeller is not driven while the thrust unit is pivoted from the first position into the second position. An undesired transverse force component, which would impair the maneuvering behavior and create a potentially dangerous situation while the ship is maneuvered, is thereby prevented.

Within this framework it is possible for the shifting clutch to disengage automatically in order to interrupt the propeller drive when the selector lever reaches the middle position when being moved from a first adjustment range to a second adjustment range starting in the first position of the thrust unit. When the middle position is subsequently passed through and the second adjustment range is entered, the thrust unit is pivoted approximately 180° into a second position opposite the first position. The shifting clutch is re-engaged once the thrust unit has reached the second position.

Moreover, once the shifting clutch has engaged, the rotational speed of the internal combustion engine is increased once more in accordance with the deflection of the control device.

In addition, it is possible to reduce the rotational speed of the internal combustion engine when the selector lever is moved to the opposite adjustment range, starting from a first position of the thrust unit, and to assume a minimum value when the selector lever is in the middle position, while the shifting clutch is disengaged. When the selector lever is moved further into the opposite adjustment range, the thrust unit is pivoted into the opposite, second position. Once the shifting clutch has engaged, the rotational speed of the internal combustion engine is increased in accordance with the deflection of the control device.

As an alternative thereto, it is possible to suppress the disengagement and engagement of the shifting clutch using an additional operating device, whereby the reversing procedure takes place more rapidly, although with the disadvantage of impaired maneuverability due to the rotating propeller thrust.

It is possible that the drive device for implementing the method according to the invention be in the form of a pivotable ship propulsion system which is also referred to as a rudder propeller. It comprises a transmission unit which is fixedly disposed within a hull, and a thrust unit which is situated underneath the hull and can pivot about a substantially vertical control axis. To transmit power from the internal combustion engine to the propeller, shafts arranged in the shape of a "Z" are disposed within the drive device in a rotatable, interconnected manner. The pivotable ship propulsion system advantageously makes it possible to direct the thrust generated by the propeller in order to steer the ship.

In an advantageous embodiment of the drive device, it is possible to pivot the thrust unit, including the propeller shaft mounted thereon, and, therefore, the direction of thrust of the propeller at least 360° about the substantially vertical control axis. Advantageously, any direction of thrust required to maneuver the sailing ship can be attained using a pivot angle of at least 360°. In addition, the direction of thrust of the drive unit can be reversed into the opposite direction from any position of the thrust unit.

BRIEF DESCRIPTION OF THE DRAWINGS

Embodiments of the invention are depicted in the drawings and are described in greater detail in the following.

The drawings show.

DETAILED DESCRIPTION OF THE PREFERRED EMBODIMENTS

Figure 1:
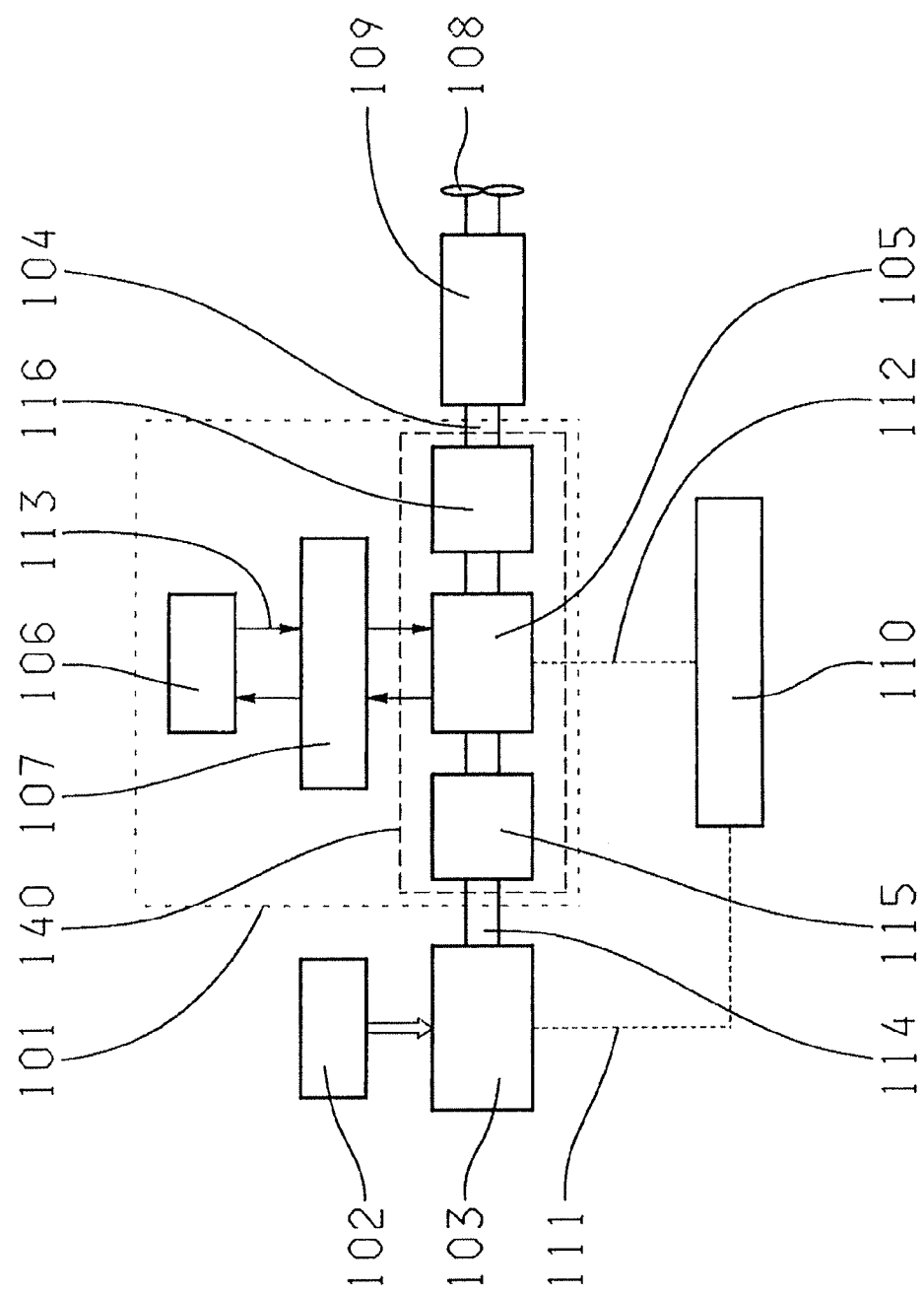
FIG. 1 a schematic depiction of a hybrid system of a ship according to the invention, FIG. 2 a schematic depiction of a sailing ship comprising the ship propulsion system according to the invention, FIG. 3 a schematic depiction of the drive train of the ship propulsion system according to the invention, FIG. 4 a schematic depiction of a control device of the ship propulsion system according to the invention, FIG. 5 a sectional view of a drive device according to the invention, FIG. 6 a perspective depiction of the drive device and the electric machine, FIG. 7 a schematic depiction of a sailing ship comprising the ship propulsion system according to the invention, in the sailing mode, FIG. 8 a schematic depiction of a ship comprising a pivotable ship propulsion system and the control device during travel forward, FIG. 9 a schematic depiction of a ship comprising a pivotable ship propulsion system and the control device during travel backward, and FIG. 10 schematic top view of a ship in which propeller thrust is directed to propel the ship in a first direction.

FIG. 1 shows a schematic depiction of a hybrid drive system of a ship according to the invention. By definition, a hybrid drive system contains at least two energy converters, each of which has an energy accumulator system. The hybrid drive system according to the invention comprises an internal combustion engine 103 having a fuel tank 102 as an energy accumulator, and an electric machine 105 comprising a battery 106 as an energy accumulator. The hybrid drive system is designed as a so-called parallel hybrid, that is, as an option, both the internal combustion engine 103 and electric machine 105 can drive the output drive directly, i.e. a propeller 108 in this case.

The electric machine 105, in combination with a shifting clutch 115 and a shifting clutch 116, forms a drive unit 140. The drive unit 140, in combination with power electronics 107, the battery 106, and a drive device 109, forms an electric hybrid unit 101. The drive device 109 drives a propeller 108. The internal combustion engine 103 and the electric hybrid unit 101 are controlled by an electronic control unit 110 via the electrical connections 111 and 112, wherein the control unit 110 determines different operating modes of the hybrid drive system.

The shifting clutch 115 is disposed between the electric machine 105 and an output shaft 114 of the internal combustion engine 103, and the shifting clutch 116 is disposed between the electric machine 105 and an input shaft 104 of the drive device 109. The electric machine 105, the internal combustion engine 103, and the drive device 109 can be connected to one another in a rotationally fixed manner via the shifting clutches 115 and 116.

The electric machine 105 can be operated as a generator or a motor independently of the particular operating mode, depending on the actuation. In the generator mode, the battery 106 is charged by power electronics 107. When the charge direction 113 is reversed, the electric machine 105 is operated as a motor using the electric energy accumulated in the battery 106.

In a driving range with a moderate to high speed of the ship, both shifting clutches 115 and 116 are engaged, and the internal combustion engine 103 can drive the propeller 108. In this position of the shifting clutches 115 and 116, the electric machine 105 can be operated as a generator, and therefore the internal combustion engine 103 drives both the propeller 108 and the electric machine 105, and therefore charges the battery 106. Likewise, when the battery 106 is sufficiently charged, it is also feasible to operate the electric machine 105 as a motor, wherein the drive power of the internal combustion engine 103 and the electric machine 105 add up and can therefore cover brief peak demands for drive power; this is also referred to as "booster mode". In the same constellation, the internal combustion engine 103 can also be relieved by the additional power of the electric machine 105. Since the internal combustion engine 103 is operated at relatively high loads when the ship is traveling at a moderate to high speed, the operating point of the internal combustion engine 103 is located in or near the minimal consumption range. The electric machine 105 can also be shut off via the electronic control unit 110 or the power electronics 107 and then be driven without load by the internal combustion engine 103.

If the shifting clutch 115 is engaged and the shifting clutch 116 is disengaged, the internal combustion engine 103 can drive the electric machine 105 and, with this as the generator, charge the battery. This operating mode can be selected when the ship is at a standstill or when sailing. If the shifting clutches 115 and 116 are in the same position, the internal combustion engine 103 can be started up with the electric machine 105, which acts as a starter, in the motor mode.

The ship can be driven electrically by disengaging the shifting clutch 115 and engaging the shifting clutch 116. The electric machine 105 is driven by the electrical energy accumulated in the battery 106 when so actuated by the electronic control unit 110 or the power electronics 107, and the internal combustion engine 103 is shut off. An electric drive is advantageous at low ship speeds in particular since, under these conditions, the operating point of the internal combustion engine 103 is situated far from the minimal consumption range. In addition, quiet and exhaust-free operation of the ship propulsion system is thereby made possible in surroundings subject to noise or environmental regulations.

A further advantage of the electric drive is the possibility of reversing the rotational direction of the electric machine 105 in order to reverse the direction of travel of the ship. This is a great advantage when maneuvering, for example. For instance, a reverse coupling can be omitted in the drive device 109, in contrast to the prior art. In addition, the electric drive makes sensitive maneuvering possible since the rotational speed of the electric machine 105 and, therefore, the rotational speed of the propeller can be changed up to the point of standstill.

Moreover, one more operating mode can be attained when the two shifting clutches 115 and 116 are in the shift position described. In the sailing mode, the propeller 108 acts as a turbine due to the movement of the ship through the water, and drives the electric machine 105 via the drive device 109 and the engaged shifting clutch 116, whereby it is operated as a generator and charges the battery 106. This option is particularly advantageous since the electrical energy is ultimately created by wind power, without fuel consumption and the associated environmental impacts.

Since driving the electric machine 105 using the propeller 108 generates drag, the sailing ship loses speed in this operating mode. For this reason, the battery 106 is charged using wind energy only at a defined minimum speed or above; below this point the propeller 108 can be allowed to rotate without load by disengaging the shifting clutch 116.

If, in the sailing mode, the battery 106 is fully charged and the shifting clutch 116 is disengaged to allow the propeller 108 to rotate without load, a disadvantageous operating noise is produced by the drive device 109 rotating without load. To prevent this, the electric machine 105 can be actuated in such a manner that it builds up torque. The propeller 108 is brought to a standstill via appropriate control of the electric machine 105 which is operated as a motor.

Figure 2:
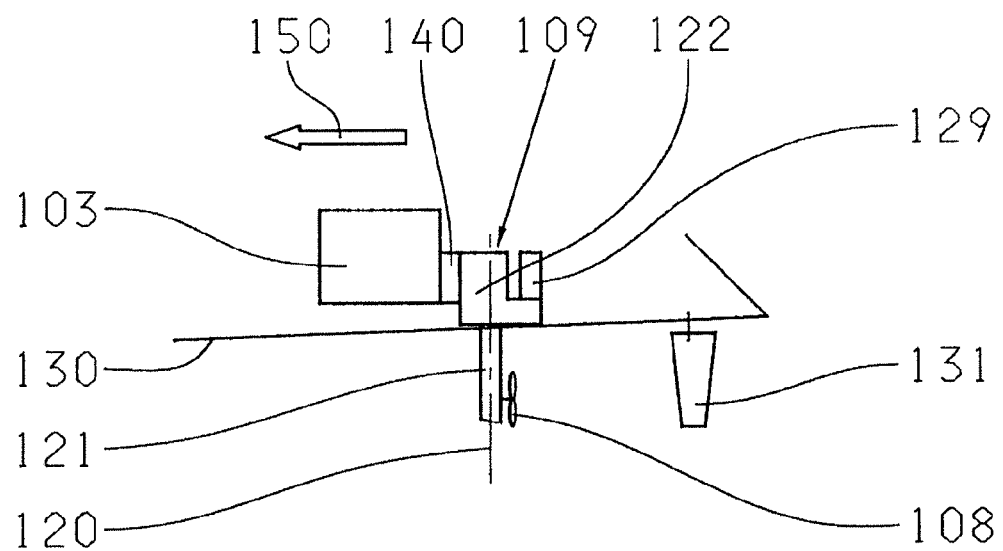

FIG. 2 shows a schematic depiction of a stern section of a sailing ship comprising the ship propulsion system according to the invention. An arrow 150 indicates the forward travel direction. An internal combustion engine 103, on which a drive unit 140 designed as a hybrid module is mounted, is disposed in a hull 130. The drive device 109, which is downstream in the flow of force, drives the propeller 108. The drive device 109 comprises a transmission unit 122, which is fixedly disposed within the hull 130, a thrust unit 121, and a control drive 129. The thrust unit 121 is disposed underneath and outside of the hull 130 at the transmission unit 122, in a manner such that it can pivot about a vertical control axis 120, wherein the thrust unit 121 is moved by the control drive 129. A rudder 131 for steering the sailing ship in the sailing mode is pivotably disposed on the stern end of the hull 130. If the sailing ship is driven in the motor mode by the hybrid drive or the propeller 108, the sailing ship is steered by pivoting the thrust unit 121. Advantageously, any direction is therefore feasible, which is highly advantageous for maneuvering in particular. To reverse the direction of travel, in the normal case the internal combustion engine 103 is shut off and the rotational direction of the electric machine 105 is reversed, and so the propeller 108 also rotates in the opposite direction. It is therefore possible to reverse in a precise manner, especially since the electric machine 105 can be started from a standstill. When the propeller 108 is driven using the internal combustion engine 103, it can rotate in only one direction. If the electric machine 105 has failed and the sailing ship must be maneuvered exclusively using the internal combustion engine 103, the thrust unit 121 is pivoted in the opposite direction.

Figure 3:
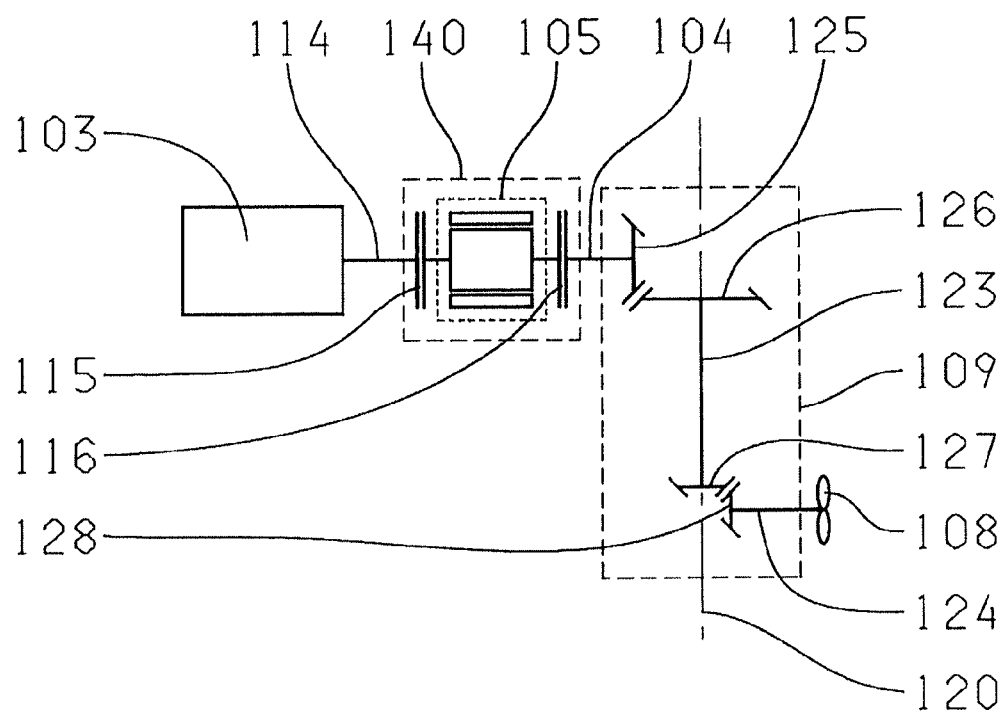

FIG. 3 shows a schematic depiction of the drive train of the ship propulsion system according to the invention. As presented above with reference to FIG. 1, the internal combustion engine 103 is connected to the drive unit 140 via an output shaft 114. The rotational movement of the hybrid drive is introduced into the drive device 109 via the input shaft 104. The drive device 109 includes the shafts 104, 123 and 124, which are arranged in the shape of a "Z", and two bevel gear systems which couple the shafts to one another, and which is formed by a bevel gear 125 and 126, and a bevel gear 127 and 128. Within the drive device 109, the bevel gear 125 is disposed on the input shaft 104 in a rotationally fixed manner. The bevel gear 125 is engaged with a bevel gear 126 which is disposed on a shaft 123 at the upper end thereof in a rotationally fixed manner. The rotational axis of the shaft 123 is the substantially vertical control axis 120. The bevel gear 127 is disposed thereon in a rotationally fixed manner at the lower end of the shaft 123. The bevel gear 127 is engaged with the bevel gear 128, wherein the bevel gear 128 is disposed on one end of the shaft 124 within the drive device 109 in a rotationally fixed manner. At the other end of the shaft 124, outside of the drive device 109, the propeller 108 is connected to the shaft 124 in a rotationally fixed manner. Since, in the normal case, the direction of travel is reversed using the electric machine 105, a reverse coupling in the drive 109 is not required. If the electric machine 105 fails and the direction of travel should be reversed, e.g. to perform docking or undocking maneuvers, this can be accomplished by pivoting the thrust unit 121 shown in FIG. 2.

Figure 4:
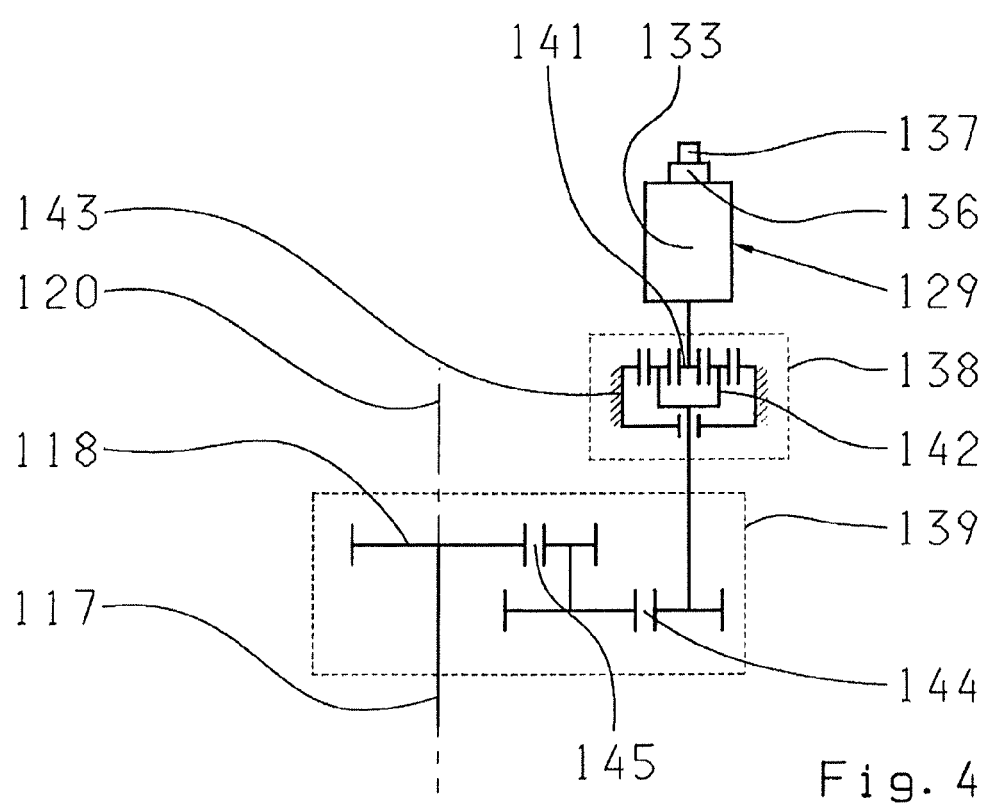

FIG. 4 shows a schematic depiction of a control device of the ship propulsion system according to the invention. The control device includes a control drive 129, a planetary transmission 138, an auxiliary transmission 139, and a control shaft 117. The control shaft 117 is connected to the thrust unit 121 (not depicted) in a rotationally fixed manner. An external gearwheel 118 is connected to the control shaft 117 in a rotationally fixed manner on an outer contour thereof. The control drive 129 comprises an electric motor 133, a brake 136, and an emergency actuation mechanism 137. To set a desired course of the sailing ship, the thrust unit 121 must be pivoted by a certain angle about the control axis 120. To this end, a control signal turns on the electric motor 133 and the control drive 129. Since an electric motor generally rotates relatively rapidly, but the pivoting motion of the thrust unit 121 must take place with great angular accuracy, the rotational speed of the electric motor 133 is reduced via the planetary transmission 138 and the auxiliary transmission 139 to the required angular velocity of the control shaft 117. To this end, the electric motor 133 drives a sun gear 141 of the planetary transmission 138. A ring gear 143 is held, and so the output drive from the planetary transmission 138 takes place via the planet carrier 142. The thusly reduced rotational speed is now reduced further in the auxiliary transmission 139 via a spur gear stage 144 and a spur gear stage 145. The output of the auxiliary transmission 139 takes place via the gearwheel 118 directly to the control shaft 117 to which the gearwheel 118 is connected in a rotationally fixed manner. If the desired position of the thrust unit 121 has been reached, the electric motor 133 is shut off and the thrust unit 121 is prevented via the brake 136 from rotating in a self-acting manner, which is undesired. If the electric motor 133 fails, the control drive 129 can be actuated mechanically using the emergency actuation mechanism 137, thereby enabling a course to be set in a makeshift manner.

Figure 5:
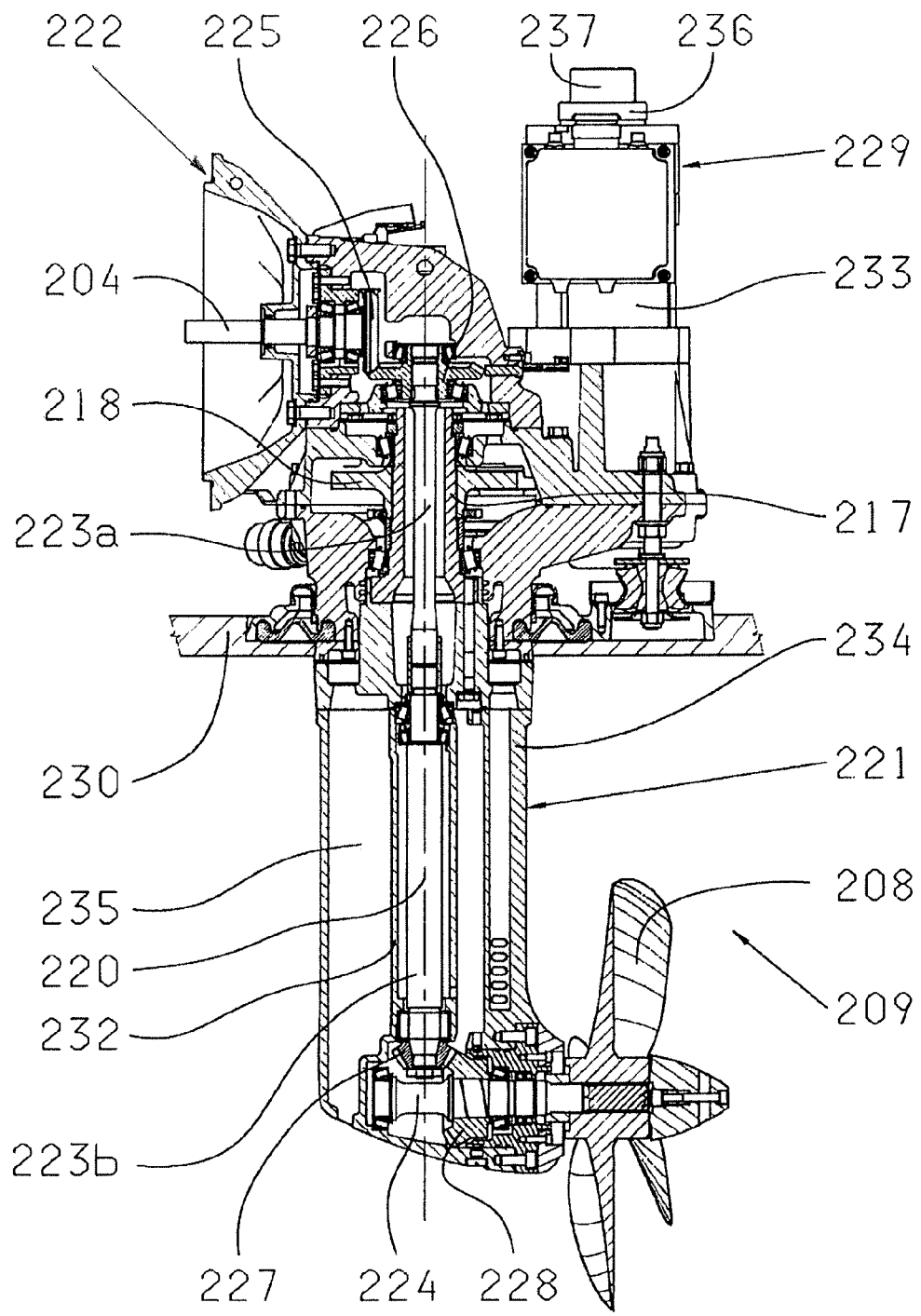

FIG. 5 shows a sectional view of a drive device 209 according to the invention.

The drive device 209 comprises a transmission unit 222 and a thrust unit 221. The transmission unit 222 is fixedly disposed above and within a hull 230. The thrust unit 221 is mounted in the transmission unit 222 such that it can pivot about a control axis 220. The transmission unit 222 comprises a control drive 229 which includes an electric motor 233, a brake 236, and an emergency actuation mechanism 237. The mode of operation of the brake 236 and the emergency actuation mechanism 237 were described with reference to FIG. 4. A bevel gear 225 on an input shaft 204 is engaged with a bevel gear 226 on a shaft 223a and drives it as well as an adjacent shaft 223b in the thrust unit 221. The shafts 223a and 223b are interconnected in a form-locking manner, and both rotate about the control axis 220. The shaft 223b is connected in the thrust unit 221 via a bevel gear 227 and a bevel gear 228 to a shaft 224, wherein a propeller 208 is connected in a rotationally fixed manner to the shaft 224 at one end thereof outside of a housing 234. The shaft 223b is rotatably disposed in a shaft channel 232. A supply of lubricant is provided inside the shaft channel 232, which serves to lubricate the bearings and gearing 225, 226, 227 and 228. A cooling channel 235 is formed between the shaft channel 232 and the housing 234, into which water surrounding the thrust unit 221 seeps. The water serves as a cooling medium for the power-transmitting parts of the drive device 209. The thrust unit 221 is driven via the control drive 229, the electric motor 233 of which drives—via a planetary transmission, which is not depicted, and an auxiliary transmission which is shown only in part—a gearwheel 218 and, therefore, a control shaft 217 with the thrust unit 221 connected thereto.

Figure 6:
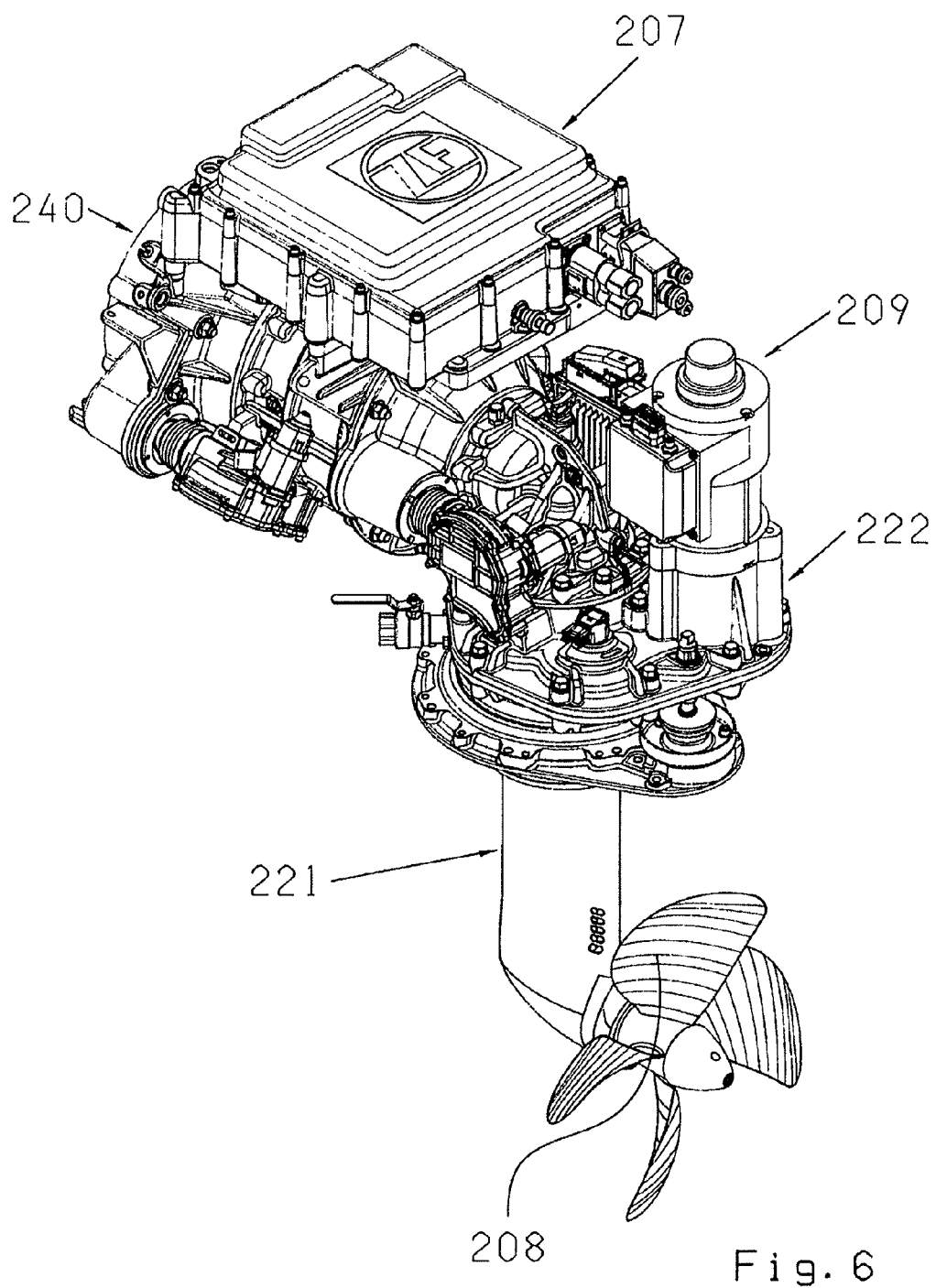

FIG. 6 shows a perspective view of the drive device 209 which comprises the thrust unit 221 with the propeller 208 and the transmission unit 222. The drive device 209 is mounted on a drive unit 240 in this depiction. Power electronics 207 are disposed directly on the drive unit 240. The direct connection of all components results in a compact hybrid drive. The direction of thrust of the propeller 208 can be changed in the manner described with reference to FIGS. 2 to 5, which results in the positive effect of good propulsion efficiency as well as good maneuverability, in particular when docking and undocking.

Figure 7:
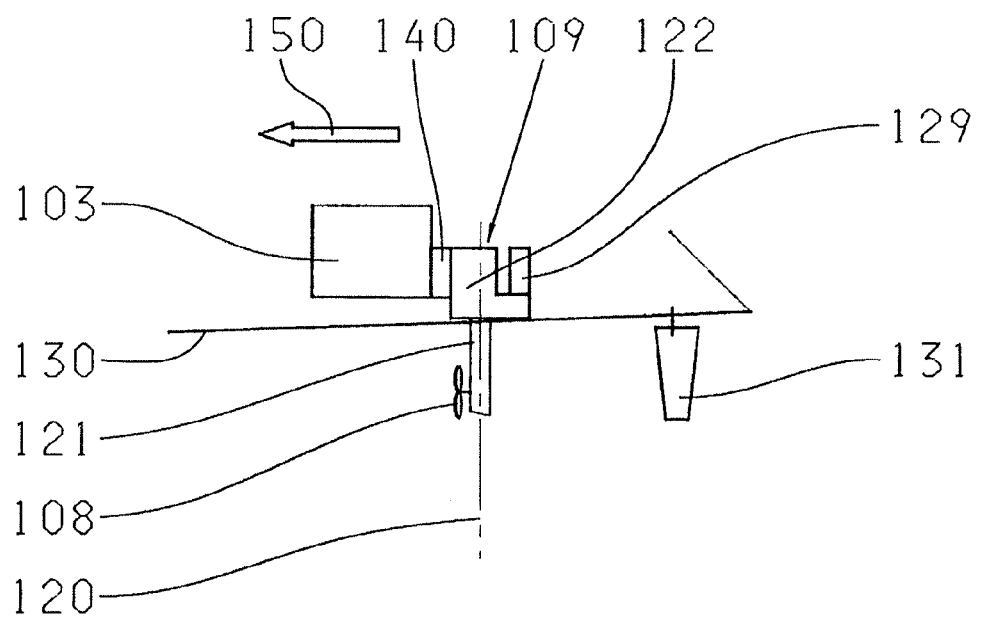

FIG. 7 shows the schematic depiction of a stern section of a sailing ship comprising the drive device 109 according to the invention. An arrow 150 indicates the forward travel direction. The features shown correspond to those in FIG. 2. The thrust unit 121 is pivoted in the opposite longitudinal direction compared to the depiction in FIG. 2. This position of the thrust unit 121 makes two operating modes possible, and advantageously affects them. The first operating mode is travel backward with the internal combustion engine 103 as the drive, which is only necessary in exceptional cases, however, such as when the electric machine 105 fails. Since the internal combustion engine 103 cannot change its own rotational direction nor, therefore, that of the propeller 108, the thrust of the propeller 108 is directed by pivoting the thrust unit 121 in the opposite direction, thereby making it possible to reverse the direction of travel.

Another operating mode, in which the thrust unit is pivoted approximately 180° from the drive direction into the opposite direction, which occurs during straight-ahead travel, for example, is that of charging the battery in the sailing mode. In this case the propeller 108 operates as a turbine which is driven by the water being passed through, thereby driving the electric machine 105. It is operated as a generator in this operating mode, and the electrical energy that is generated is accumulated in the battery, where it is available for quiet and exhaust-free operation of the electric machine 105, or for operation of on-board devices. In order to be able to attain all necessary directions of thrust, the thrust unit 121 must be capable of pivoting at least 360°.

Maneuverability is increased even further via a combination of the ship propulsion system according to the invention with a cross jet propeller (not depicted) which is preferably disposed in the bow of the hull 130.

The vanes of a propeller have a certain geometry of curvature, which was designed for a defined rotational direction to optimally convert drive energy into thrust. If the propeller is now operated as a turbine driven by the water being passed through in the same orientation it assumed for driving, then the conversion of energy of flow into drive energy for the electric machine 105, which is operated as a generator, is inefficient since the flow impacts the side of the propeller vanes that do not have a favorable design for this operation. If the propeller 108 is oriented in the opposite direction by pivoting the thrust unit 109, the flow forces act on the side of the vane that has a more favorable design for energy conversion, and a greater amount of electrical energy can be generated. Since a sailing ship is subject to a certain lateral drift in the sailing mode, the direction of travel does not always coincide with the longitudinal direction of the sailing ship. In this case the propeller 108, which is operated as a turbine, would be impacted by flow at an angle, which is detrimental to energy conversion. In addition, a compression of the drift would therefore be possible here in that the drift and, therefore, the actual direction of travel of the sailing ship are measured or calculated, and the thrust unit 109 is oriented by an appropriate pivot angle into the actual direction of travel. The drift can be measured using GPS data or radar-supported data, for example.

Figure 8:
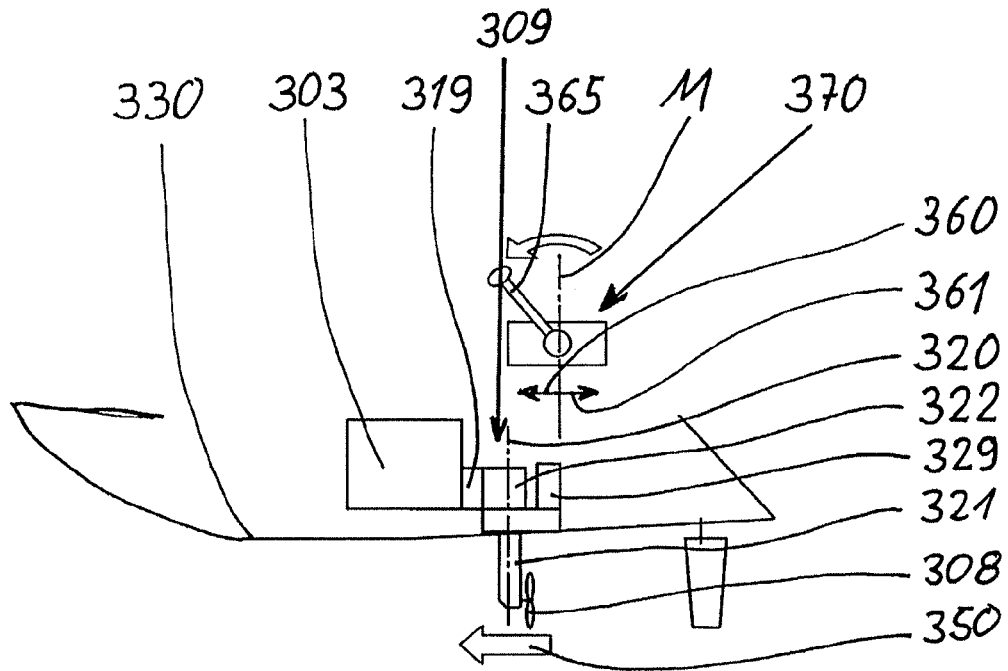

FIG. 8 shows a schematic depiction of a ship, which is shown only in part, comprising an internal combustion engine 303, a pivotable ship propulsion system 309, which is also referred to as a rudder propeller, and a control device 370 in the form of a selector lever 365, when traveling forward. Alternatively, the control device 370 can also be in the form of a joystick, a keyboard, an actuator wheel, a sliding regulator, or a panel with a touchscreen.

A drive device 309 disposed in a hull comprises a shifting clutch 319, a transmission unit 322, a thrust unit 321 which can pivot about a substantially vertical control axis 320, and a control drive 329 via which the thrust unit 321 is pivoted. In the example shown, the shifting clutch 319 is designed as a friction clutch. In principle, a form-locking clutch can also be used for this purpose. The internal combustion engine 303 drives at least one propeller 308 via the shifting clutch 319, the transmission unit 322, and the thrust unit 321. The rotational direction of the internal combustion engine 303 cannot be changed, and therefore the rotational direction of the propeller 308 is also defined. In the depiction, a propeller 308 is oriented toward the stern using the thrust unit 321 and generates a propeller thrust directed astern, whereby the ship moves in a forward travel direction 350. This motion is controlled via a selector lever 365 which was moved within an adjustment range 360 for forward travel. If the intention now is to reverse the direction of thrust of thrust unit 321, the selector lever 365 is moved in an actuating direction opposite the actuating direction 360 into the adjustment region 361 for travel in reverse. As a result, the thrust unit 321 is pivoted approximately 180° into a position diametrically opposed to the position for forward travel, whereby the ship moves in the reverse travel direction 351. To prevent a transverse force on the hull 330 resulting from the thrust force which pivots with the rotation of thrust unit 321, it is possible to shut off the propeller 308 by disengaging the shifting clutch 319 at the onset of the pivoting motion of the thrust unit 321, and to re-engage it once the opposite position has been reached.

The rotational speed of the internal combustion engine 303 or the propeller 308 is reduced as the selector lever 365 moves toward a middle position M. The signal for reversing the direction of thrust is received by an electronic control unit (not depicted) when the selector lever 365 is moved from a first adjustment range 360, through the middle position M, and into a second adjustment range 361. As a result, the shifting clutch 319 is disengaged and then the thrust unit 321 is pivoted approximately 180° via the control drive 329 into the opposite position. Once the pivoting procedure—which is also referred to as reversal in this context—has been completed, the shifting clutch 319 is re-engaged. When the selector lever 365 is moved further, into the second adjustment range, the rotational speed of the internal combustion engine 303 and the propeller 308 is increased once more, analogous to the forward travel direction. Shifting behavior free of torque surges can be attained using friction shifting clutch 319, when so actuated.

If the selector lever 365 is moved only into the middle position M, the shifting clutch 319 disengages. If the information as to which adjustment range the selector lever 365 was moved out of and into the middle position M is stored in the electronic control unit, then, if the selector lever is moved further, out of the middle position M and into the opposite adjustment range, the electronic control unit recognizes the request to reverse the direction of thrust, upon which the thrust unit 321 is pivoted approximately 180° by the control drive into a second position, which is opposite the first position.

An alternative reversal of the direction of propulsion that does not involve disengagement and engagement of the shifting clutch 319 is attained using a method in which the rotational speed of the internal combustion engine 303 and the propeller 308 is reduced when the selector lever is moved toward the middle position M, and reaches a certain minimum rotational speed in the middle position, preferably the idle speed of the internal combustion engine 303. During the reversing procedure, which also describes the pivoting motion of the thrust unit 321 approximately 180° into the opposite direction of thrust, the unwanted thrust transverse to the longitudinal axis 480 (see FIGS. 10 and 11) remains limited to a minimum amount. The advantage thereof is that the reversing procedure is shorter. In order to recognize the request to reverse the direction of thrust, the reversing procedure can be triggered only when the selector lever 365 is moved from the first adjustment range 360, through the middle position M, and into the second adjustment range 361. If the selector lever 365 is moved only into the middle position, the shifting clutch disengages. Additional operating elements which are not shown can be used to suppress the disengagement of the shifting clutch 319.

Figure 9:
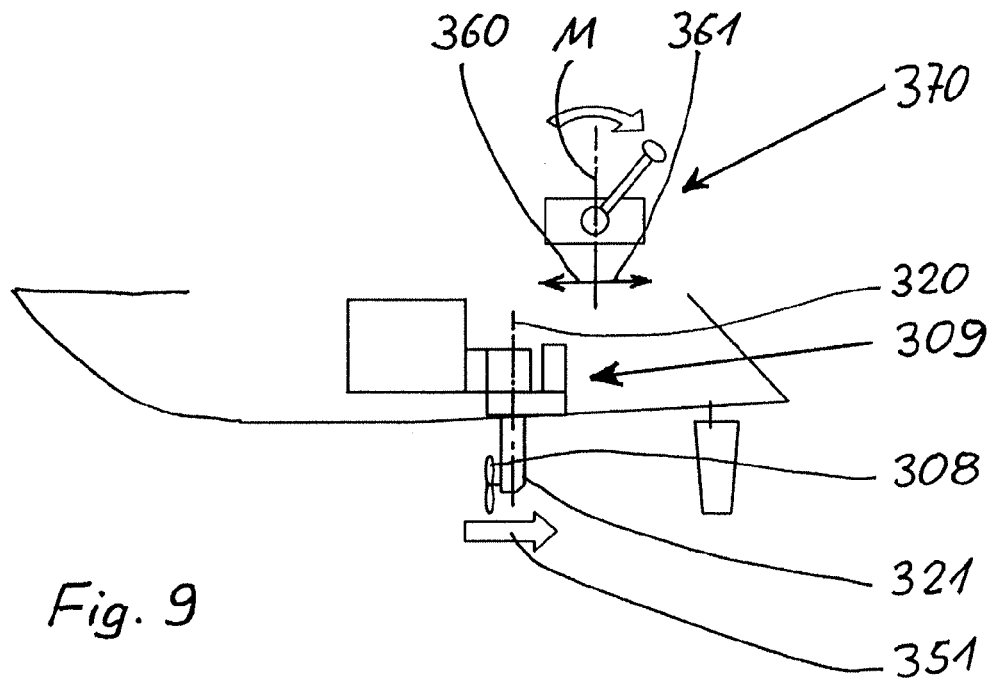
Figure 10:
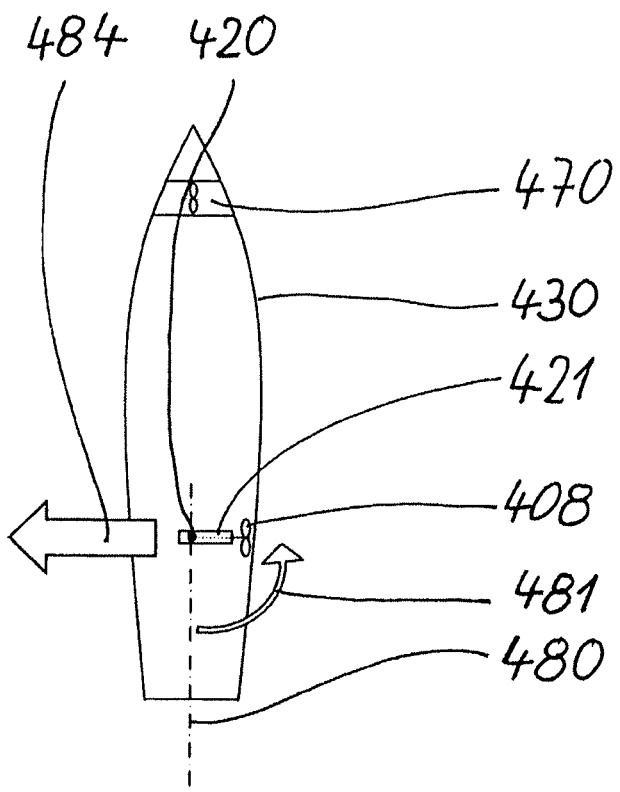
Figure 11:
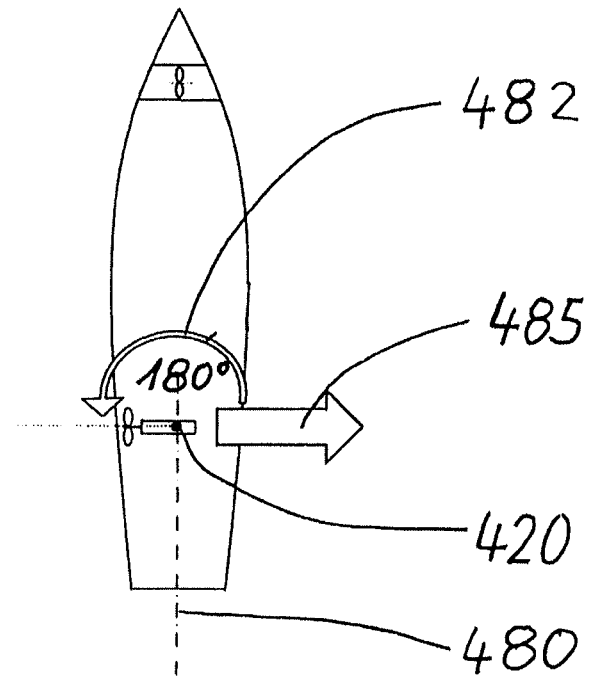
FIG. 11 a schematic top view of a ship in which propeller thrust is redirected to propel the ship in second direction opposite the first direction depicted in FIG. 10, and FIG. 12 a sectional drawing of an embodiment of a ship propulsion system according to the invention.

FIG. 10 and FIG. 11 show, in a schematic top view of a ship, the reversal of the propeller thrust from an arbitrary position of a thrust unit 421. The reversing procedure proceeds analogously to the switch between forward travel and reverse travel, as described with reference to FIGS. 8 and 9. On the underside of a hull 430, the thrust unit 421 of a pivotable ship propulsion system, which is also referred to as a rudder propeller, can be pivoted about a substantially vertical control axis 420. In FIG. 10 the thrust unit is rotated about a steering angle 481 of 90° relative to the longitudinal direction 480 of the ship, and so the thrust of the propeller 408 pushes the ship to the left in the direction of motion 484. A direction of motion that is not in the longitudinal direction is required for docking, for instance. If the intention now is to brake this motion or reverse the direction of motion 484 into direction of motion 485, the thrust unit 421 is rotated about a pivot angle 482 of approximately 180° into the opposite direction, as depicted in FIG. 11, in order to reverse the direction of thrust of the propeller 408. As a possible additional option, a cross jet propeller 470 is disposed in the region of the bow on the hull 430 shown, which likewise can generate a thrust component transverse to the longitudinal direction of the ship and thereby expand the maneuvering options. The direction of thrust can be reversed from an arbitrary pivot angle 481 if the thrust unit 421 is able to rotate freely, and if the thrust unit can pivot at least 360°. A cross jet propeller in the region of the stern for improving maneuverability can be omitted, which is advantageous, since the direction of thrust is freely selectable.

Figure 12:
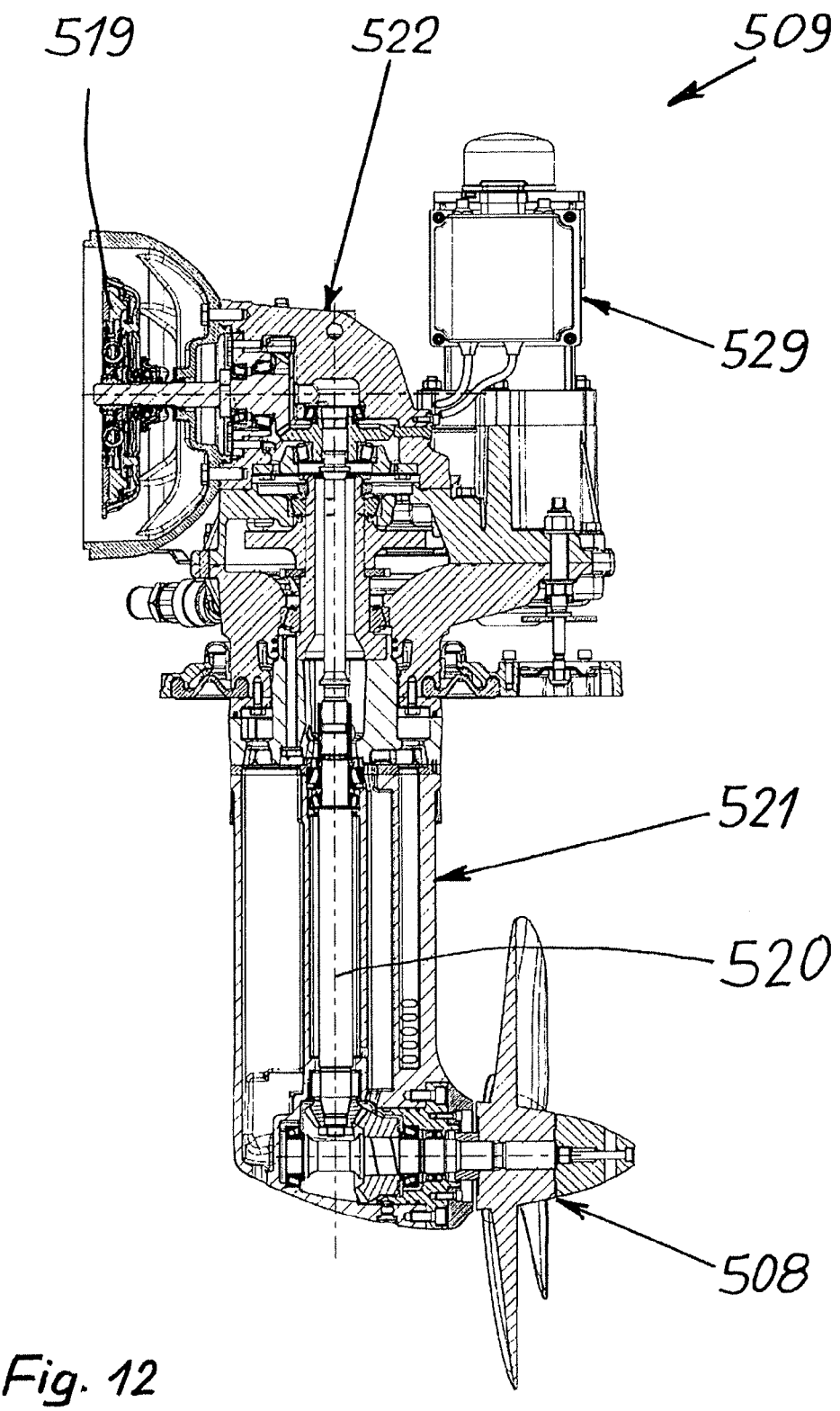

FIG. 12 shows, by reference to a sectional drawing, an embodiment of a drive device 509 which can be used to implement the method for reversing the direction of thrust, which is described with reference to FIGS. 8 to 11. A shifting clutch 519 for decoupling the driving internal combustion engine from the propeller 508 is disposed on a transmission unit 522. In this example, the shifting clutch 519 is in the form of a friction clutch, thereby ensuring that engagement and disengagement is comfortable and smooth. Couplings from the automotive industry can also be used for this purpose, which is favorable in terms of cost. As an alternative, a form-locking shifting clutch would also be feasible. A thrust unit 521 is pivoted about a substantially vertical control axis 520 via a control drive 529, wherein the control drive 529 is in the form of an electric motor in the example shown. As a possible alternative, hydraulic actuation via a hydrostatic pump-motor system would be feasible.

REFERENCE CHARACTERS

101 electric hybrid unit
102 fuel tank
103 internal combustion engine
104 drive device input shaft
105 electric machine (motor/generator)
106 battery
107 power electronics
108 propeller
109 drive device
110 electronic control unit
111 electric connection
112 electric connection
113 charge direction
114 internal combustion engine output shaft
115 shifting clutch
116 shifting clutch
117 steering shaft
118 gearwheel
120 control axis
121 thrust unit
122 transmission unit
123 shaft
124 shaft
125 bevel gear
126 bevel gear
127 bevel gear
128 bevel gear
129 control drive
130 hull
131 rudder
133 electric motor
136 brake device
137 emergency actuation mechanism
138 planetary transmission
139 auxiliary transmission
140 drive unit
141 sun gear
142 planet carrier
143 ring gear
144 spur gear stage
145 spur gear stage
150 forward travel direction
204 drive device input shaft
205 electric machine (motor/generator)
207 power electronics
208 propeller
209 drive device
217 steering shaft
218 gearwheel
220 control axis
221 thrust unit
222 transmission unit
223a shaft
223b shaft
224 shaft
225 bevel gear
226 bevel gear
227 bevel gear
228 bevel gear
229 control drive
230 hull
232 shaft channel
233 electric motor
234 housing
235 cooling channel
236 brake device
237 emergency actuation mechanism
240 drive unit
303 internal combustion engine
308 propeller
309 drive device
319 shifting clutch
320 control axis
321 thrust unit
322 transmission unit
329 control drive
330 hull
350 forward travel direction
351 reverse travel direction
360 adjustment range
361 adjustment range
365 selector lever
370 control device
408 propeller
420 control axis
421 thrust unit
430 hull
470 cross jet propeller
480 longitudinal axis of the ship
481 steering angle
482 pivot angle
484 direction of motion
485 direction of motion
508 propeller
509 drive device
519 shifting clutch
520 control axis
521 thrust unit
522 transmission unit
529 control drive
M middle position

The invention claimed is:

1. A method of operating a hybrid drive system of a ship, the method comprising the steps of:
forming the hybrid drive system from an internal combustion engine (103, 303) and an electric machine (105),
forming a drive unit (140) from the electric machine (105) and at least one shifting clutch (115, 116),
transmitting drive power to at least one propeller (108, 208, 308, 408, 508) via a drive device (109, 209, 309, 509),
forming the drive device (109, 209, 309, 509) as a ship propulsion system that is pivotable about a substantially vertical control axis (120, 220, 320, 420, 520),
forming an electric hybrid unit (101) from the drive device (109), the drive unit (140), power electronics (107), and a battery (106),
controlling the internal combustion engine (103) and the electric hybrid unit (101) with an electric control unit (110),
determining different operating modes of the hybrid drive system via the control unit (110),
pivoting a thrust unit (121, 221, 321, 421, 521), associated with the drive device (109, 209, 309, 509), and using the drive device (109, 209, 309, 509) to change a direction of thrust of the propellers (108, 208, 308, 408, 508),
signaling a command to reverse the ship by a reverse actuation of a control device (370),
in response to the reverse actuation of the control device (370), if the electric machine is functioning, the electronic control unit reversing a direction of travel of the ship via reversing a rotational direction of the electric machine (105) and reversing a rotational direction of the propellers (108, 208, 308, 408, 508) from a normal rotational direction to an opposite rotational direction, and
in response to the reverse actuation of the control device (370), if the electric machine (105) fails, the electronic control unit pivots the pivotable thrust unit (121, 221, 321, 421, 521) approximately 180° in an opposite direction to reverse the direction of thrust of the propeller (108, 208, 308, 408, 508) such that the ship is maneuverable exclusively via the internal combustion engine (103).

2. The method according to claim 1, further comprising the step of recording a current first position of the thrust unit (121, 221, 321, 421, 521) in the electronic control unit, and, pivoting the thrust unit from the current first position of the thrust unit by approximately 180° into an opposite, second position, if a request to reverse the direction of thrust is entered into the electronic control unit.

3. The method according to claim 2, further comprising the steps of
positioning a selector lever (365) in a first adjustment range (360) to position the thrust unit (121, 221, 321, 421, 521) in a first position,
positioning the thrust unit (121, 221, 321, 421, 521) in a second position, which is approximately 180° opposite the first position, when the selector lever (365) is positioned in a second adjustment range (361), and
reversing the direction of thrust of the thrust unit (121, 221, 321, 421, 521) by moving the selector lever (365) from one of the first and the second adjustment ranges (360, 361), past a middle position (M), and into the other of the first and the second adjustment ranges (360, 361).

4. The method according to claim 3, further comprising the steps of reducing a rotational speed of the internal combustion engine when, starting from a first position of the thrust unit (121, 221, 321, 421, 521), moving the selector lever (365) to the opposite adjustment range to a minimum value in the middle position (M) of the selector lever (365) while the shifting clutch (319, 519) is disengaged, and, when the selector lever (365) is moved further into the opposite adjustment range, pivoting the thrust unit (121, 221, 321, 421, 521) into the opposite, second position and then, once the shifting clutch (319, 519) engages, increasing the rotational speed of the internal combustion engine (303) in accordance with a deflection of the selector lever (365) in the particular adjustment range.

5. The method according to claim 1, further comprising the step of adjusting a direction of thrust of the thrust unit (121, 221, 321, 421, 521) with a rudder device, and entering the request to reverse the direction of thrust of the thrust unit (121, 221, 321, 421, 521) via a selector lever (365) of a control device (370).

6. The method according to claim 1, further comprising the step of, when the thrust unit (121, 221, 321, 421, 521) pivots from a first position into a second position, discontinuing transmission of drive power to the propeller (108, 208, 308, 408, 508).

7. The method according to claim 6, further comprising the step of automatically disengaging a shifting clutch (115, 116, 319, 519), to discontinue the transmission of drive power to the propeller (108, 208, 308, 408, 508), when a selector lever (365) is at a middle position (M) upon moving from a first adjustment range (360) to a second adjustment range (361), starting from a first position of the thrust unit (121, 221, 321, 421, 521); and
when the selector lever (365) passes from the middle position (M) and enters the second adjustment range (361), pivoting the thrust unit (121, 221, 321, 421, 521) approximately 180° into a second position which is opposite the first position, and engaging the shifting clutch (115, 116, 319, 519) once the thrust unit (121, 221, 321, 421, 521) reaches the second position.

8. The method according to claim 1, further comprising the steps of:
forming the drive device as a rudder propeller which includes a transmission unit (122, 222, 322, 522) fixedly disposed within a hull (130, 230, 330, 430);
situating the thrust unit (121, 221, 321, 421, 521) underneath the hull;
supporting the thrust unit (121, 221, 321, 421, 521) so as to be pivotable about the substantially vertical control axis (120, 220, 320, 420, 520);
arranging shafts (104, 123, 124, 204, 223a, 223b, 224) in a shape of a letter Z and disposing the shafts (104, 123, 124, 204, 223a, 223b, 224) in the drive device (109, 209, 309, 509) in a rotatable, interconnected manner; and
transmitting power from the internal combustion engine (103, 303) to the propeller (108, 208, 308, 408, 508) via the shafts (104, 123, 124, 204, 223a, 223b, 224).

9. The method according to claim 8, further comprising the step of providing the thrust unit (121, 221, 321, 421, 521), including the propeller shaft (124, 224) mounted thereon as well as a direction of thrust of the propeller (108, 208, 308, 408, 508), so as to be pivotable at least 360° about the substantially vertical control axis (120, 220, 320, 420, 520).

10. The method according to claim 1, further comprising the step of providing the ship with a sail by which the ship may be propelled via wind power.

11. A sailing ship comprising,
a sail by which the ship may be propelled via wind power;
a hybrid drive system comprising an internal combustion engine (103, 303) and an electric machine (105),
the electric machine (105) and at least one shifting clutch (115, 116) forms a drive unit (140), a drive device (109, 209, 309, 509) for transmitting drive power to at least one propeller (108, 208, 308, 408, 508), the drive device (109), the drive unit (140), power electronics (07) and a battery (106) form an electric hybrid unit (101), an electric control unit (110) for controlling the internal combustion engine (103) and the electric hybrid unit (101), the control unit (110) determining different operating modes of the hybrid drive system, when a rotational direction of the electric machine (105) is reversed, a direction of travel of the ship is reversed, the drive device being in the form of a rudder propeller which includes a transmission unit (122, 222, 322, 522) fixedly disposed within a hull (130, 230, 330, 430);

a thrust unit (121, 221, 321, 421, 521) being situated underneath the hull and pivotable about the substantially vertical control axis (120, 220, 320, 420, 520); and shafts (104, 123, 124, 204, 223a, 223b, 224) being arranged in a shape of a letter Z and disposed within the drive device (109, 209, 309, 509) in a rotatable, interconnected manner to transmit power from the internal combustion engine (103, 303) to the propeller (108, 208, 308, 408, 508);

a reverse actuation of a control device (370) signaling a command to reverse the ship;

in response to the reverse actuation of the control device (370), if the electric machine is functioning, the electronic control unit reverses the direction of travel of the ship via reversing a rotational direction of the electric machine (105) and reverses a rotational direction of the propellers (108, 208, 308, 408, 508) from a normal rotational direction to an opposite rotational direction, and in response to the reverse actuation of the control device (370), if the electric machine (105) fails, the electronic control unit automatically pivots the pivotable thrust unit (121, 221, 321, 421, 521) approximately 180° in an opposite direction to reverse a direction of thrust of the propeller (108, 208, 308, 408, 508) so that the ship is maneuverable exclusively via the internal combustion engine (103).

12. The sailing ship according to claim 11, wherein the thrust unit (121, 221, 321, 421, 521) and the propeller shaft (124, 224) mounted thereon, as a direction of thrust of the propeller (108, 208, 308, 408, 508), being pivotable at least 360° about the substantially vertical control axis (120, 220, 320, 420, 520).

* * * * *